(12) United States Patent
Chen (10) Patent No.: US 7,841,831 B2
(45) Date of Patent: Nov. 30, 2010

(54) ASYMMETRICALLY CHANGING ROTATING BLADE SHAPE (ACRBS) PROPELLER AND ITS AIRPLANE AND WIND TURBINE APPLICATIONS

(75) Inventor: Franklin Y. K. Chen, One Meadow Glen Rd., Northport, NY (US) 11768

(73) Assignee: Franklin Y. K. Chen, Northport, NY (US)

( * ) Notice: Subject to any disclaimer, the term of this patent is extended or adjusted under 35 U.S.C. 154(b) by 954 days.

(21) Appl. No.: 11/592,851

(22) Filed: Nov. 3, 2006

(65) Prior Publication Data

US 2008/0121752 A1 May 29, 2008

(51) Int. Cl.
*B64C 11/30* (2006.01)
*F03D 3/02* (2006.01)
*F03D 7/06* (2006.01)
*F04D 29/36* (2006.01)

(52) U.S. Cl. .................. 416/116; 416/132 R; 416/159
(58) Field of Classification Search ............. 416/132 B, 416/134 A, 132 R, 132 A, 128, 159, 24, 113, 416/116
See application file for complete search history.

(56) References Cited

U.S. PATENT DOCUMENTS

| | | | |
|---|---|---|---|
| 1,403,069 A | 1/1922 | Burne | |
| 1,796,540 A * | 3/1931 | Schleede | .................. 416/113 |
| 1,864,316 A | 6/1932 | Poniatowski | |
| 2,197,293 A * | 4/1940 | Bremner | .................. 416/113 |
| 2,340,709 A | 2/1944 | Stillman | |
| 2,414,435 A * | 1/1947 | Bendix | .................. 416/24 |
| 3,284,027 A * | 11/1966 | Mesniere | .................. 244/12.4 |
| 3,914,068 A | 10/1975 | Nonnenmann | |
| 4,178,127 A | 12/1979 | Zahorecz | |
| 4,547,125 A * | 10/1985 | McMahon, II | .................. 416/117 |
| 5,118,255 A * | 6/1992 | Moreno | .................. 416/117 |
| 5,193,978 A | 3/1993 | Gutierrez | |
| 5,207,558 A | 5/1993 | Hagle et al. | |
| 5,616,963 A * | 4/1997 | Kikuchi | .................. 290/55 |
| 5,844,323 A | 12/1998 | Hung | |
| 6,719,244 B1 * | 4/2004 | Gress | .................. 244/7 R |
| 6,929,450 B2 * | 8/2005 | Noble | .................. 416/1 |
| 6,942,458 B2 | 9/2005 | McCallum et al. | |
| 6,991,426 B2 | 1/2006 | Pietricola | |
| 2004/0155143 A1 * | 8/2004 | Yoeli | .................. 244/17.11 |

* cited by examiner

*Primary Examiner*—Edward Look
*Assistant Examiner*—Jesse Prager
(74) *Attorney, Agent, or Firm*—Robert T. Maldonado; Cooper & Dunham LLP (57) ABSTRACT

A propeller includes a plurality of propeller blades. Each blade has an adjustable drag coefficient. A plurality of actuators adjusts the drag coefficients of the propeller blades. A controlling unit controls the plurality of actuators such that the drag coefficients of each propeller blade is adjusted according to a pattern that is dependent upon the rotational angle of the particular propeller blade so that the drag of each propeller blade is maximized at the same point through a course of revolution and minimized throughout the remainder of that revolution.

22 Claims, 12 Drawing Sheets

ASYMMETRICALLY CHANGING ROTATING BLADE SHAPE (ACRBS) PROPELLER AND ITS AIRPLANE AND WIND TURBINE APPLICATIONS

BACKGROUND

1. Technical Field

The present disclosure relates to an asymmetrically changing rotating propeller and, more specifically, to an asymmetrically changing rotating blade shape propeller and its airplane and wind turbine applications.

2. Description of the Related Art

A propeller is a device which forces fluid passing through it and increases the fluid kinetic energy. Vehicles or vessels such as airplanes, ships and submarines may use propellers to propel though a fluid such as air or water. Alternatively, a propeller can be placed in the path of a moving fluid to absorb the fluid kinetic energy, such as a wind mill. A typical propeller is generally comprised of one or more twisted blades which are rotated around a central shaft.

Conventional propellers have an identical geometric configuration that remains constant as the blades revolve around the central shaft. Both lift and drag force components are developed on the blade. Only the fluid momentum increase in the axial direction is utilized to produce desired axial thrust.

While conventional propellers provide symmetric thrust with respect to each revolution cycle, examples of asymmetric propulsion techniques are known. For example, when rowing a rowboat, a boater sweeps an oar from front to back while its face is submerged in water and then, to complete the rowing cycle, the boater carries the oar to its original front position while removed from the water. By moving the oar from the more dense water to the less dense air on the return stroke, the boater is able to apply maximum energy during the front-to-back sweep and conserve energy on the return thereby maximizing propulsion efficiency. The angle of the oar may also be adjusted by the boater to further optimize propulsion efficiency Another example is when a swimmer performs the breaststroke. Here a swimmer's arms are swept from front-to-back while under the water and are then returned to their original front position while removed from the water. The angle of the swimmer's hands may also be adjusted to optimize the propulsion efficiency.

In this way, the boater and swimmer are able to adjust the coefficient of drag of the oar/arm so that the drag is higher where it is needed the most and lower where it is needed the least. However, conventional propellers are unable to adjust their coefficient of drag during the blade's cycle of rotation and thus propulsion cannot be optimized.

Some propellers in the art have the ability to change blade pitch to improve propeller performance. For example, U.S. Pat. No. 6,991,426, to Pietricola, and U.S. Pat. No. 6,942,458, to McCallum et al., describe variable pitch propellers where blade pitch is adjusted according to the needs of the airplane. For example, the blades may have one pitch during takeoff and another pitch during high-altitude cruise.

While such variable pitch propellers have the ability to alter blade lift and drag coefficients, lift and drag are not changed during the course of the propeller's rotational cycle. Another example involved the wing flapping of a bird or an insect. In the first half of a wing-flapping cycle, the wing pushes the air downward/backward of the bird. This increases downward/backward air momentum passing through the wing. The reaction to this air momentum increase is a force which pushes the bird upward/forward. Next, the wing must return to its starting cycle configuration in order to be ready for its next wing-flapping cycle. This is done during the second half of the wing-flapping cycle. Most wings are not designed to produce desired thrust in both half cycles. Therefore, the wing must conserve its energy to perform its second half cycle return journey.

Accordingly, it is desired that a propeller have the ability to adjust the drag coefficient of each blade during the course of the propeller's rotational cycle.

SUMMARY

A propeller includes a plurality of propeller blades. Each blade has an adjustable drag coefficient. A plurality of actuators adjusts the drag coefficients of the propeller blades. A controlling unit controls the plurality of actuators such that the drag coefficient of each propeller blade is adjusted according to a pattern that is dependent upon the rotational angle of the particular propeller blade.

A method for propelling a vehicle or vessel though a fluid includes rotating a propeller having one or more blades. The drag of each of the one or more blades is adjusted according to a pattern that is dependent upon the rotational angle of the particular propeller blade.

A method for harvesting wind energy with a wind turbine includes configuring one or more propellers with one or more blades to be rotated by the force of wind. The drag of each of the one or more blades is adjusted according to a pattern that is dependent upon the rotational angle of the particular propeller blade, relative to the incoming air velocity.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

A propeller according to embodiments of the present invention may include a plurality of propeller blades arranged in pairs. Each propeller blade-pair may have a set of two hinged blades that are capable of opening and closing at specific intervals in each cycle of revolution. When the blade-pairs are fully closed, the blades may be nearly flat. As the blade-pairs open, the blade becomes non-flat and the surface area of the blade-pairs, which is perpendicular to the incoming wind velocity vector, increases.

Propellers according to embodiments of the present invention may have multiple blades. While the propeller may have any number of blades, examples described herein have four blade-pairs.

According to one embodiment, all of the blade-pairs may have hinged blades.

Figure 1:
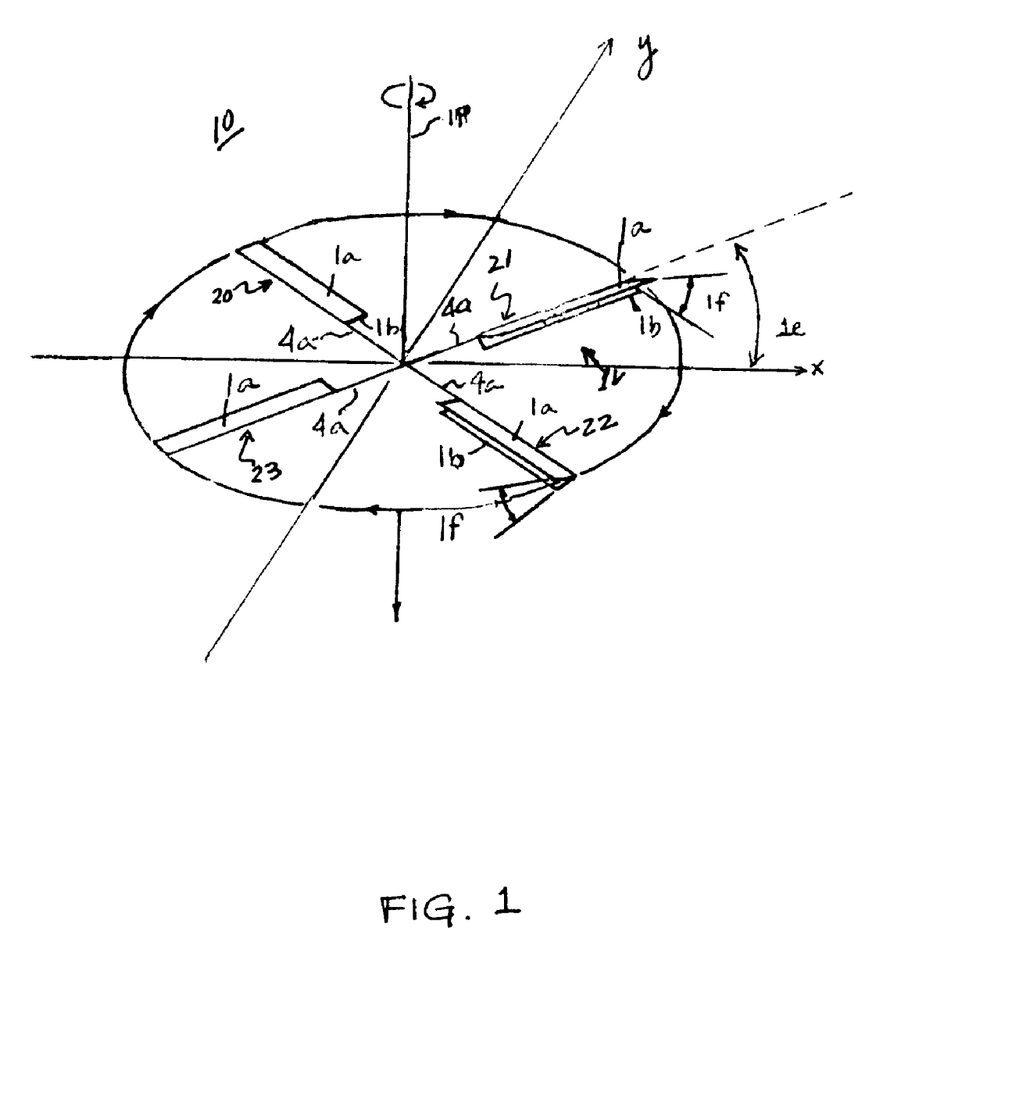
FIG. 1 is a perspective view of an example propeller according to an embodiment of the present invention.

FIG. 1 is a planar view of an example propeller according to an embodiment of the present invention. The propeller 10 has four blade-pairs 20, 21, 22, 23 that each consist of a first blade 1a hingedly connected along a radial axis to a second blade 1b. The details of the structure and connection of the blades will be described in more detail herein with reference to FIGS. 5A through 5D and FIG. 10. The four blade-pairs 20, 21, 22, 23 are further arranged in pairs of two 20, 22 and 21, 23 with each blade-pair being disposed 180 degrees from the other blade-pair in the pair, and each pair being 90 degrees displaced from the other pair, for example. The blade-pairs are interconnected with connecting members 4a to form the propeller 10. The propeller 10 rotates around a central axis 1p, in a clockwise direction so that the opening of the blade-pairs faces the incoming tangential air velocity vector 1v.

The changing area of the propeller blades can best be understood with reference to the plane of rotation defined by the x- and y-axes depicted in FIG. 1. The angle of rotation 1e of any given blade-pair 20, 21, 22, 23 is measured with respect to a predefined start point (0°), in this case chosen to coincide with the x-axis. The angle of the opening 1f between the blades 1a, 1b of each blade-pair 20, 21, 22, 23 changes throughout one cycle of rotation (360°) from a maximum at angle of rotation of 0° (i.e. 1e=0°) to a minimum (i.e., 1f=0°) when the blade-pair is outside the range −80°<1e<+80°. The angle of opening 1f may range from 0° to a maximum of, for example, 90°. The angle of opening 1f may be dependent upon the angle of rotation 1e which describes the blade's position in the rotational cycle.

Because the opening angle 1f is a function of the angle of rotation 1e and there are four blade-pairs spaced 90° from each other, each blade-pair closes and opens according to the same formula, but at 90° out of phase from the nearest blade-pairs, and 180 degrees out of phase from the opposite radii blade-pair. Accordingly, the drag of the propeller is asymmetric as at any given time, as all blades may not share the same closing angle.

Figure 2A:
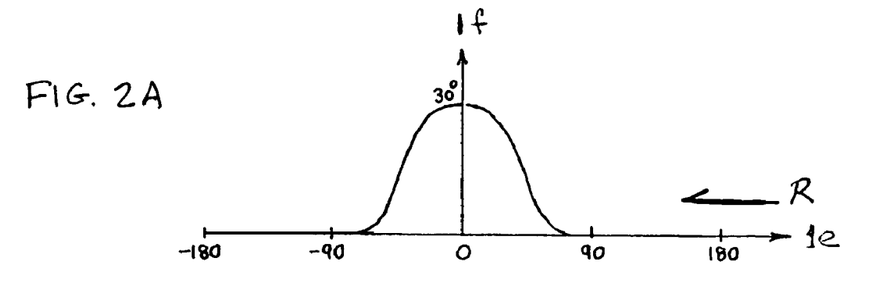
FIG. 2A is a graph showing an example of how the opening angle of the propeller blades may change as a function of the angle of rotation.
Figure 2B:
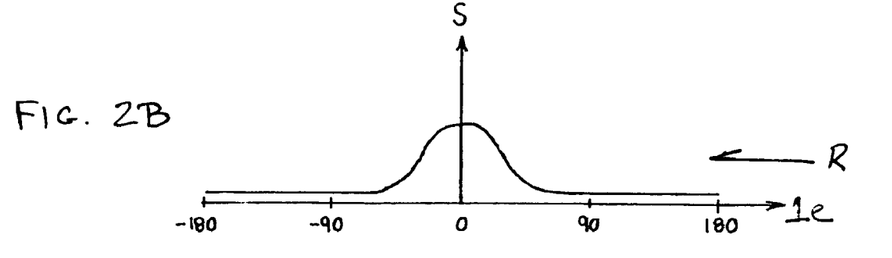
FIG. 2B is a graph showing an example of how the surface area (perpendicular to the incoming tangent velocity due to propeller rotation) of the propeller blades may change as a function of the angle of rotation.
Figure 2C:
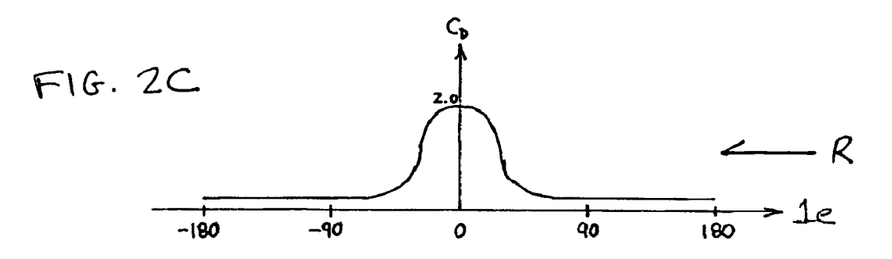
FIG. 2C is a graph showing an example of how the drag coefficient of the propeller blades may change as a function of the angle of rotation.

FIGS. 2A through 2C show different parameters of the blades as a function of the angle of rotation 1e. It is important to note that the diagrams of FIGS. 2A through 2C show different parameters as a function of angle of rotation, and that, if the propeller is rotating clockwise as anticipated in one embodiment of the present invention, the cycle of rotation is from right to left in each of the diagrams, i.e. from +180° to −180°, as depicted by the arrows R. According to one embodiment, as shown in FIG. 2A, the opening angle if remains at a minimum (0°), i.e. fully closed, until the angle of rotation 1e=+80° at which point the opening angle 1f gradually increases until the angle of rotation 1e reaches the starting point (0°) at which point the opening angle 1f reaches its maximum, 90° in this embodiment. Thereafter, the opening angle 1f gradually decreases to 0° as the angle of rotation 1e approaches −80°. Asymmetric variation of the opening angle if will cause asymmetric variations of the surface area S of each blade-pair and of the drag coefficients of each blade-pair throughout a cycle of rotation.

FIG. 2B shows changes in the surface area S of each blade-pair throughout a cycle of rotation. Again, the surface area of each blade-pair reaches a maximum when the angle of rotation 1e is at the starting point (0°).

FIG. 2C shows changes to the drag coefficient $C_D$ for each blade-pair throughout a cycle of rotation. The blade-pairs have a maximum drag coefficient $C_D$ of 2.0 at the point where the opening angle 1f is at a maximum, i.e. at an angle of rotation of 0°. The drag coefficient for a wing is computed using wing area that is defined as the wingspan times the wind-cord. However, for a blunt object, the area used to calculate the drag coefficient is the area perpendicular to the incoming air stream. Since an opened blade-pair is essentially perpendicular to the incoming tangential air velocity 1v, such blade-pair can be considered a blunt object, so that the blade surface area S is used for all blade drag force calculations.

The asymmetric changes in surface area and drag coefficients lead to an asymmetric increase of air momentum as the air is pushed away by the blade-pairs tangentially in the rotational plane.

The aerodynamic force on a typical blade-pair at constant rotation speed ω can be calculated using formulas described below. Only a net drag force component is developed on each blade-pair; a lift force component is not developed. This drag force vector is in the direction of the incoming tangential air velocity 1v. A useful calculation can decompose this drag force vector into its x-axis, $D_x(\theta)$, and y-axis, $D_y(\theta)$, components, where θ is the angle of rotation 1e. The x-axis and y-axis coordinate system is shown in FIG. 1 for clockwise rotating blade-pairs. According to the present invention, the drag force components are derived as follows:

$$D_y(\theta) := \frac{1}{6} \cdot \rho \cdot \omega^2 \cdot C_D(\theta) \cdot$$
$$\left[h_0 + 2 \cdot b \cdot \left(\sin\left(\frac{\phi(\theta)}{2} \cdot deg\right)\right)\right] \cdot [(R_2)^3 - (R_1)^3] \cdot (\cos(\theta \cdot deg))$$

$$D_x(\theta) := \frac{1}{6} \cdot \rho \cdot \omega^2 \cdot C_D(\theta) \cdot \left[h_0 + 2 \cdot b \cdot \left(\sin\left(\frac{\phi(\theta)}{2} \cdot deg\right)\right)\right] \cdot$$
$$[(R_2)^3 - (R_1)^3] \cdot (-\sin(\theta \cdot deg))$$

Where,
ρ is the air density,
ω is the rotation speed of the propeller,
$C_D(\theta)$ is the drag coefficient,
$h_0$ is the diameter of the blade pair hinge channel 5g,
b is the blade-pair cord 5q, which is the width of the leading edge 5a or 5b of a blade 1a or 1b, as measured from the center of the hinge channel 5g to the edge,
φ is the blade-pair opening angle 1f,
$R_2$ is the distance from the central axis 1p to the furthest end of the blade-pair,
$R_1$ is the distance from the central axis 1p to the nearest end of the blade-pair.

A typical four blade-pair propeller will have its drag force components in the y-axis and x-axis expressed as the sum of four calculations for $D_x(\theta)$ and $D_y(\theta)$ taken at 90-degree intervals along the cycle of rotation, e.g. at an angle of rotation 1e=−180°, −90°, 0°, +90° and +180°. These drag force equations can be useful to make preliminary estimates of the performance of the propeller blade systems described herein.

Figures 5A, 5C:
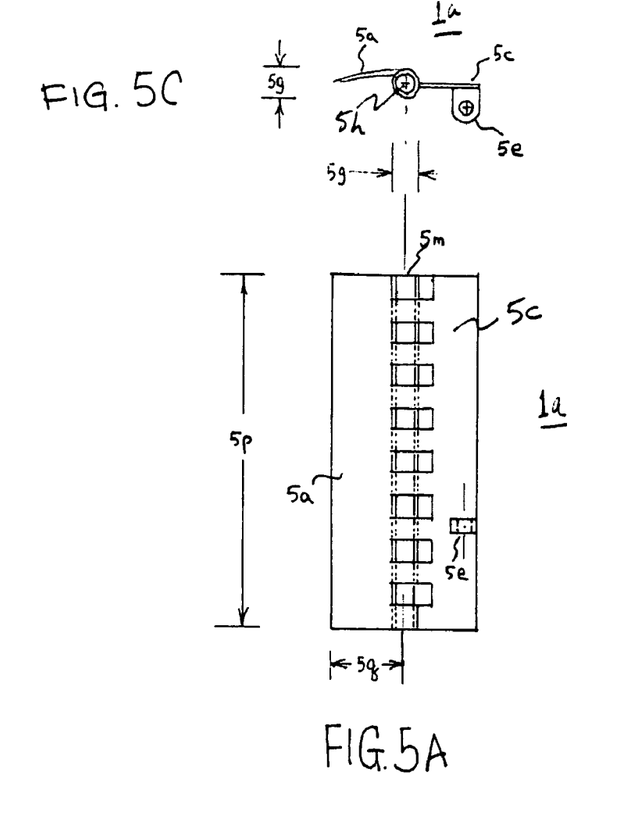
FIG. 5A is a plan view of a first propeller blade of a blade-pair according to an embodiment of the present invention.
FIG. 5C is a side view of the propeller blade depicted in FIG. 5A.
Figure 5B:
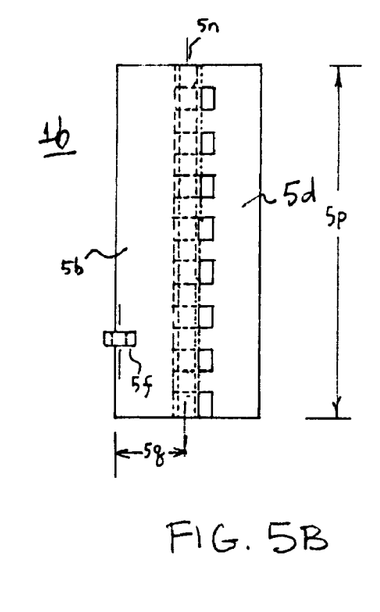
FIG. 5B is a plan view of a second propeller blade of a blade pair according to an embodiment of the present invention.
Figure 5D:
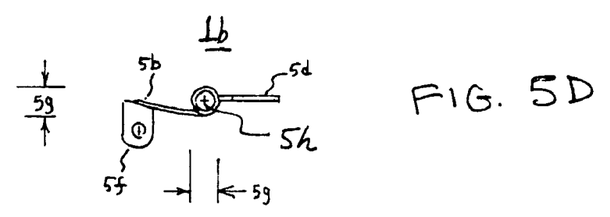
FIG. 5D is a side view of the propeller blade depicted in FIG. 5B.

A more detailed understanding of the structure of one embodiment of each blade-pair 20, 21, 22, 23 can be had by reference to FIGS. 5A through 5D. As more particularly shown in FIGS. 5A and 5C, an upper blade 1a may consist of a leading portion 5a, a hinge portion 5m, and a trailing portion 5c. As shown in FIGS. 5B and 5D, the lower blade 1b may consist of a leading portion 5b, a hinge portion 5n, and a trailing portion 5d. To assemble the blade pair, the leading portions 5a, 5b and hinge portions 5m, 5n of the upper and lower blades 1a, 1b, are fit together like a door hinge with the connecting member 4a inserted through a channel 5h formed by the hinge portions 5m, 5n to hold the leading blade portions 5a, 5b together. The hinge channel 5h has a diameter 5g as shown in FIGS. 5C and 5D. Next, the trailing portions 5c, 5d are welded onto the respective hinge portions 5m, 5n for weight balance. As can be further seen in FIGS. 5A through 5D, depending fins 5e, 5f are attached the undersides of the lower leading portion 5b and the upper trailing portion 5c, respectively, for connecting the blade-pair to the actuating mechanism, as will be described more fully hereafter.

Figure 3:
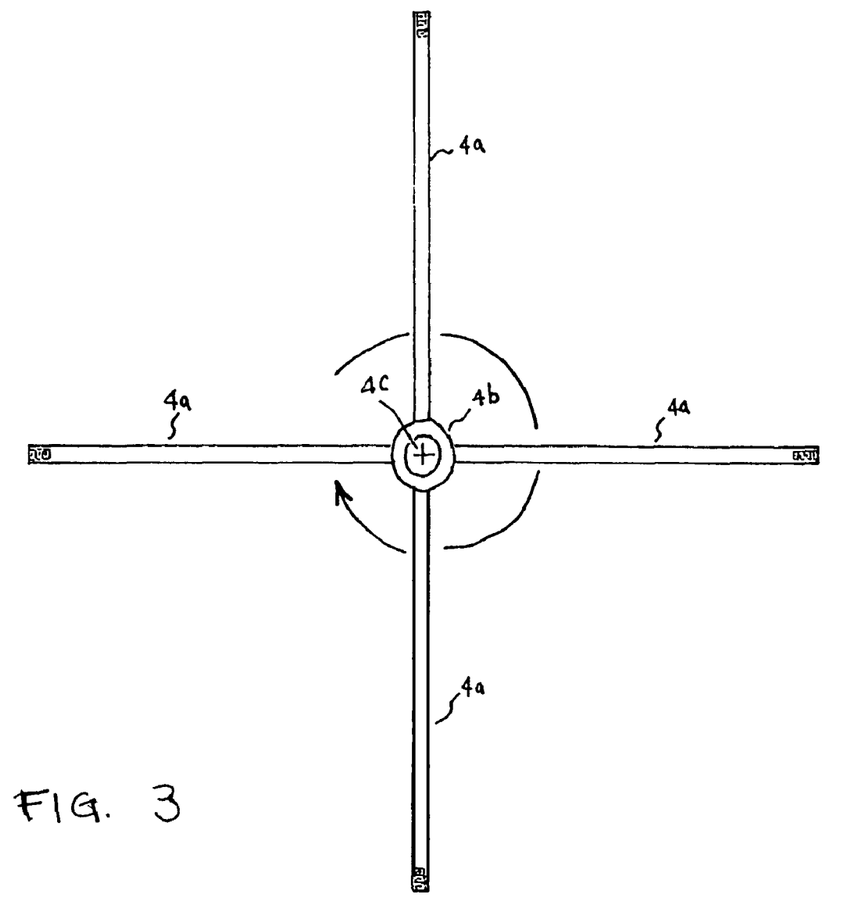
FIG. 3 is a plan view showing four connecting members which may connect four blade-pairs of a propeller according to the present invention.
Figure 4:
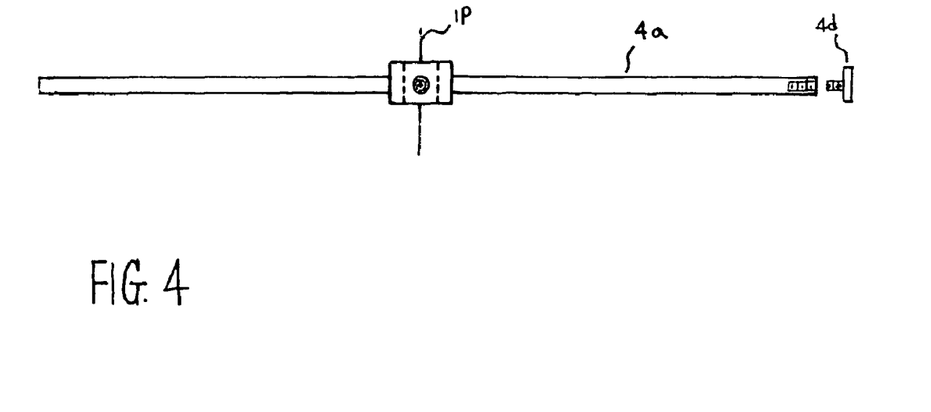
FIG. 4 is a side view of the four connecting members depicted in FIG. 3.

As discussed above, a propeller may consist of four blade-pairs 20, 21, 22, 23, arranged at 90 degree intervals. As shown in FIG. 3, four rigid connecting members 4a may be arranged in a cross-shape around a hub 4b. One blade pair is mounted on the end of each connecting member 4a, by inserting the connecting member 4a through the hinge channel 5h and capping the end with a removable endcap 4d, as shown in FIG. 4. The hub 4b of the connecting members 4a is attached to the shaft of a motor 4c for rotating the propeller 10 about the center axis of rotation 1p. The rotation may be clockwise.

Figure 8A:
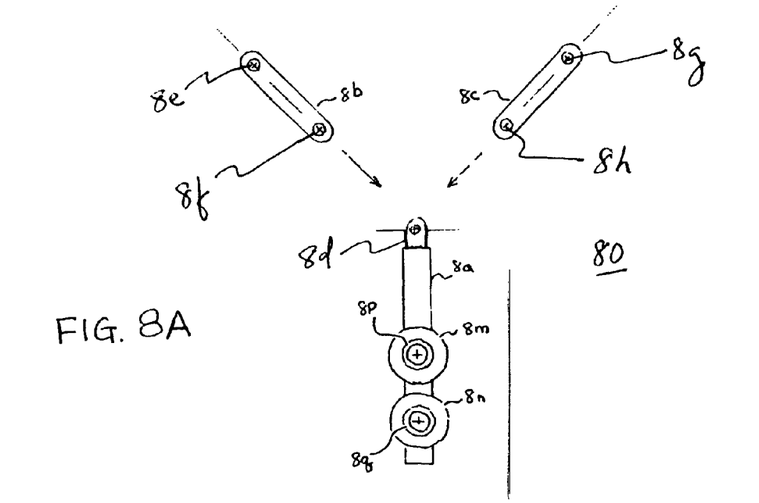
FIG. 8A is an exploded plan view of a control link and control mechanism according to an embodiment of the present invention.
Figure 8B:
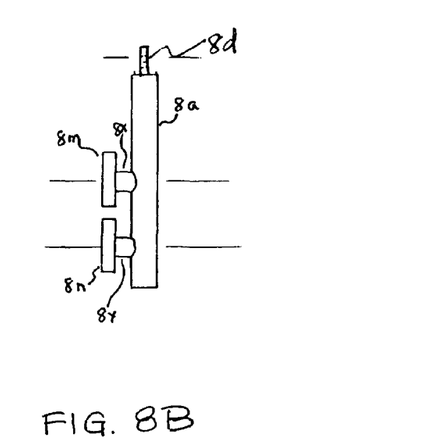
FIG. 8B is a side view of the control rod depicted in FIG. 8A.
Figure 8C:
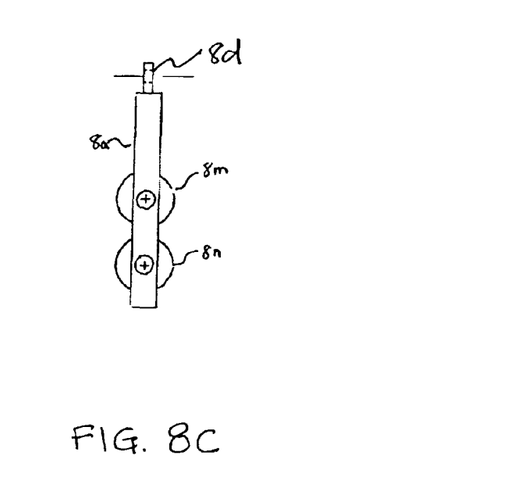
FIG. 8C is a rear view of the control rod depicted in FIG. 8A.
Figure 8D:
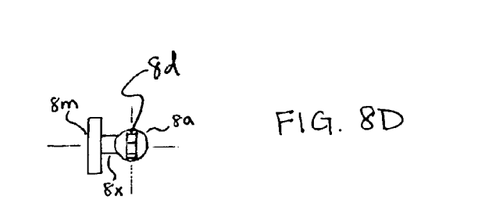
FIG. 8D is a top view of the control rod depicted in FIG. 8A.
Figure 10:
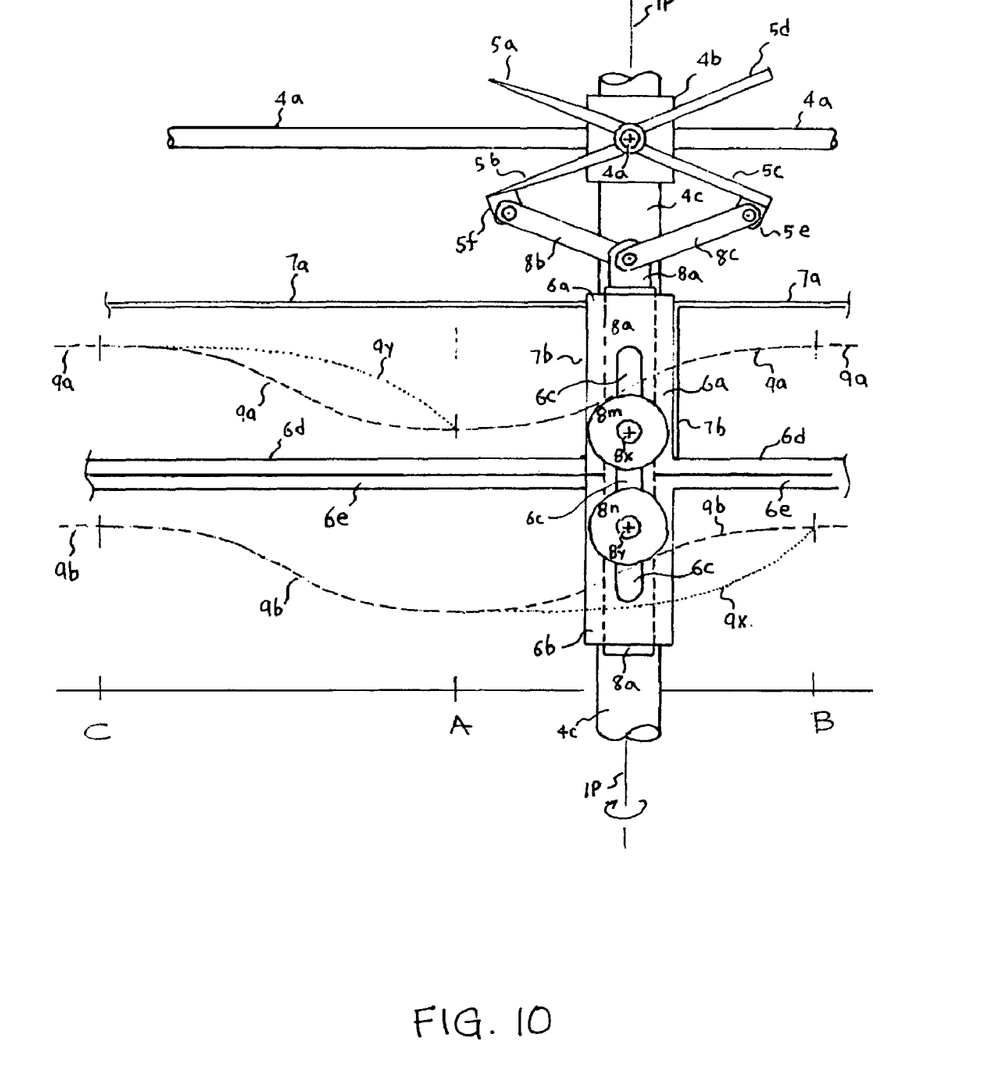
FIG. 10 is a partial side view of a propeller blade with actuating mechanism according to an embodiment of the present invention.

While there are many ways to implement the opening and closing of the blade-pairs, an actuating mechanism 80 which enables the blade-pairs 20, 21, 22, 23 to open and close according to one embodiment of the present invention will now be described. There is one actuating mechanism 80 for each blade-pair, and all actuating mechanisms are the same. As shown in FIG. 8A, the actuating mechanism 80 includes a control rod 8a which is vertically arranged as will be described herein. The control rod 8a includes an upper control wheel 8m rotatably mounted on the control rod 8a via shaft 8x, and a lower control wheel 8n rotatably mounted on the control rod 8a via shaft 8y, as shown in FIGS. 8A through 8C. The control wheels 8m and 8n rotate freely and independently of one another on respective bearings 8p, 8q, and are vertically aligned. A connection extension 8d extends from the top of each control rod 8a to connect the control rod to the control links 8b, 8c which connect to the blade-pairs. Thus, a hole 8f in the lower end of the leading control link 8b is aligned with a hole in the connection extension 8d of the control rod 8a and a hole 8h in the lower end of the trailing control link 8c, as shown in FIG. 10. The connection between the three pieces (the control links and the control rod) is such that they are rotatably connected, by, for example, a bolt inserted through the aligned holes. The holes 8e, 8g in the upper ends of the control links 8b, 8c are attached to the depending fins 5e, 5f of the lower leading portion 5b and the upper trailing portion 5c, respectively, by, for example, a bolt which permits relative rotation of the joined pieces, as shown in FIG. 10.

According to this construction, when the control rod 8a moves down, the lower leading portion 5b and the upper trailing portion 5c of the blade-pair also move down through action of the control links 8b, 8c. Since the upper trailing portion 5c is rigidly connected to the upper leading portion 5a, when the upper trailing portion 5c moves downward, the upper leading portion 5a moves upward, thereby causing the blade-pair to open. Conversely, when the control rod 8a moves up, the lower leading portion 5b and the upper trailing portion 5c of the blade-pair also move up through action of the control links 8b, 8c. Since the upper trailing portion 5c is rigidly connected to the upper leading portion 5a, when the upper trailing portion 5c moves upward, the upper leading portion 5a moves downward, thereby causing the blade-pair to close. The vertical movement of the control rod 8a is imparted by vertical movement of the control wheels 8m, 8n along a circular guide track, as will be described more fully herein.

Figure 6A:
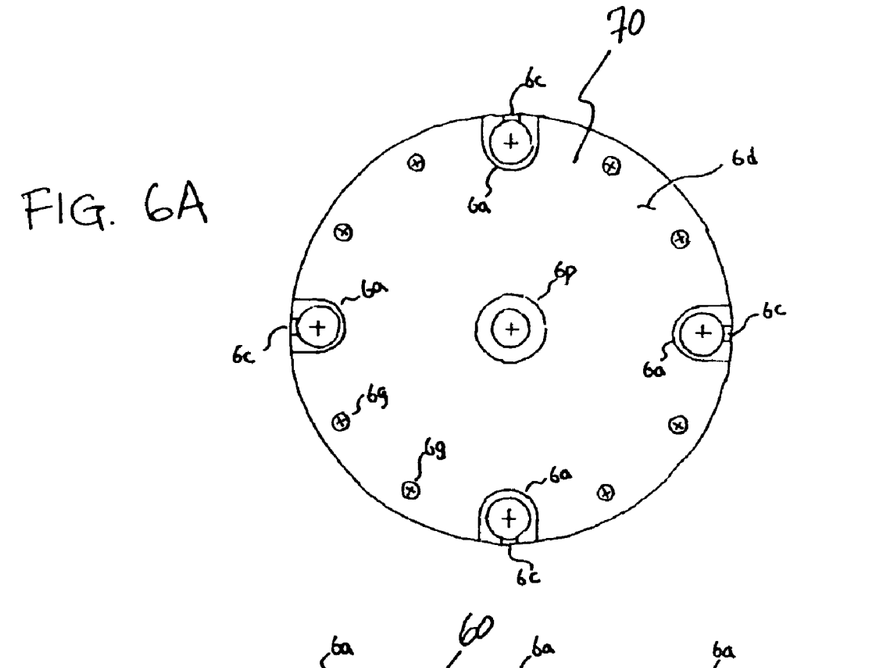
FIG. 6A is a plan view of a rotating disc with support tubes according to an embodiment of the present invention.
Figure 6B:
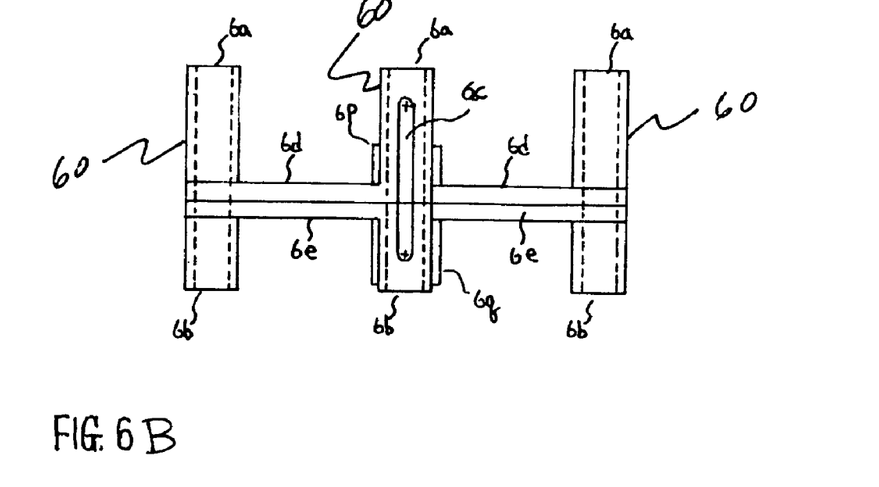
FIG. 6B is a side view of the rotating disc with support tubes depicted in FIG. 6A.

As described above, a propeller 10 may consist of four blade-pairs, and, thus, four control rods 8a. Each control rod 8a is mounted in a cylindrical support tube 60, shown in FIG. 6B. Each support tube 60 has a vertical slot 6c to guide vertical movement of the shafts 8x, 8y of the actuating mechanism 80. The four support tubes 60 may be arranged at 90 degree intervals, or however the blade-pairs are arranged, along the circumference of a rotating disc 70. The support tubes 60 are arranged so that the vertical slots 6c face outward. The rotating disc 70 may be made of an upper rotating disc 6d, and a lower rotating disc 6e, fastened together by screws (not shown) inserted in holes 6g. The holes 6g further allow the upper rotating disc 6d and the lower rotating disc 6e to be aligned. Each support tube is comprised of an upper support tube 6a, and a lower support tube 6b. The upper support tube 6a is mounted on the upper rotating disc 6d, by, for example, welding, and the lower support tube 6b is mounted on the lower rotating disc 6e, by, for example, welding. When fully assembled, the upper and lower rotating discs 6d, 6e and the upper and lower support tubes 6a, 6b, all rotate in unison along with upper and lower rotating hubs 6p, 6q.

For rotation of the blade-pairs, power is transmitted from the motor shaft 4c to the blade-pairs via the connecting members 4a. The blade-pairs in turn impart rotational movement to the control rods 8a, and, thus, to the rotating disc 70 about the axis of rotation 1p.

Figure 9A:
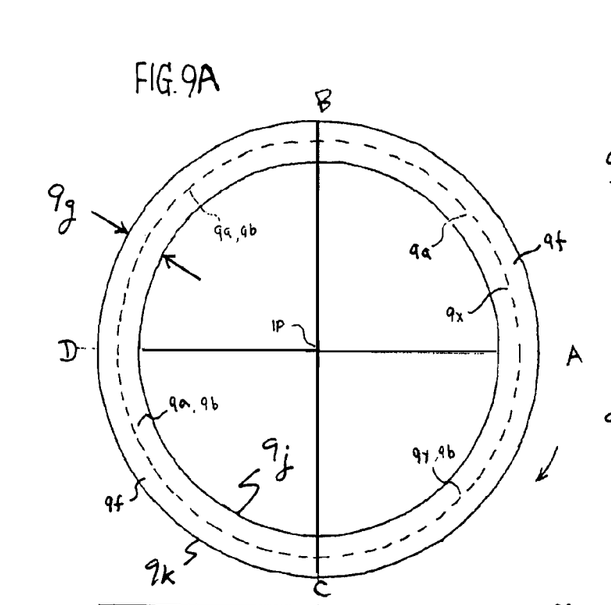
FIG. 9A is a plan view of a ring base according to an embodiment of the present invention.
Figure 9B:
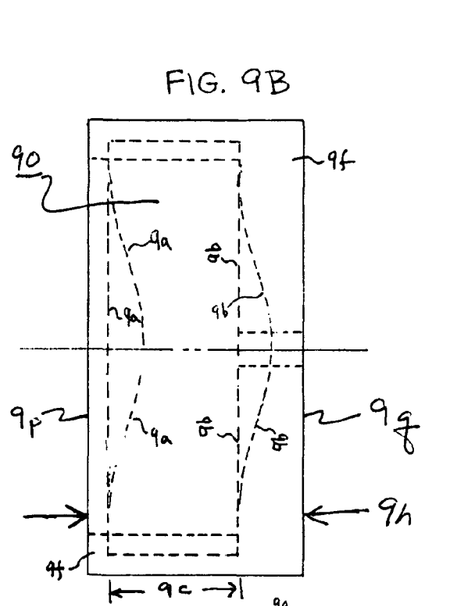
FIG. 9B. is a side view of the ring base depicted in FIG. 9A.
Figure 9C:
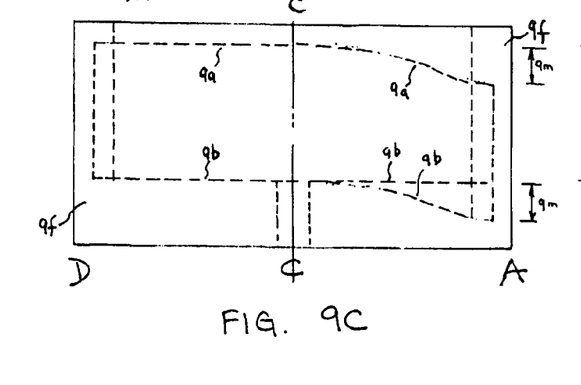
FIG. 9C. is another side view of the ring base depicted in FIG. 9A.

The vertical movement of the control rods 8a, on the other hand, is dictated by the guide track 90 depicted in FIGS. 9A through 9D. According to one embodiment of the present invention, the propeller 10 may include a circular ring base 9f, which has a predetermined wall thickness 9g and a predetermined height 9h, as shown in FIGS. 9A and 9B. The circular ring base 9f may be made of metal, a polymeric material, or any other suitable material. The circular ring base 9f has an inner surface 9j and an outer surface 9k. A guide track 90 may be carved into the inner surface 9j of the circular ring base 9f. As shown in FIG. 9A, the depth of the guide track 90 may be, for example, approximately half the wall thickness 9g of the circular ring base 9f. The guide track 90 has an upper surface 9a and a lower surface 9b which together define the width 9c of the guide track 90. The width 9c of the guide track 90 may remain constant throughout its length. The control wheels 8m, 8n travel in the guide track 90, such that the upper control wheel 8m abuts the upper surface 9a of the guide track 90, and the lower control wheel 8n abuts the lower surface 9b of the guide track 90.

Figure 9D:
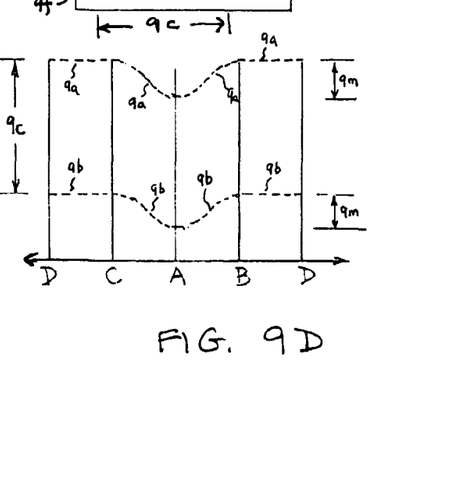
FIG. 9D is a diagram of the shape of the guide track throughout the course of a single revolution as a function of the angle of rotation.

According to one feature of the present invention, when the blade-pair is located at an angle of rotation in the range −90°>1e>+90°, i.e. when the angle of rotation 1e is not between points C and B in FIG. 9D, the upper surface 9a and the lower surface 9b of the guide track 90 are located at fixed distances from the upper and lower edges 9p, 9q of the circular ring base 9f such that the guide track 90 does not exhibit any vertical displacement. Thus, through half a cycle of rotation, i.e. from −90° to +90° when the propeller 10 is rotated in a clockwise direction, the guide track 90 is at a constant vertical distance and, accordingly, the control wheels 8m, 8n do not move up or down, and the blade-pair remains closed. In FIG. 9D, point A represents 1e=0°; point B represents 1e=+90°; point C represents 1e=−90°; and point D represents 1e=180°.

During the range of rotation where the angle of rotation 1e is between +90° and −90° (points B and C in FIG. 9D), the guide track 90 may exhibit a dip wherein the upper surface 9a and the lower surface 9b of the guide track 90 become downwardly vertically displaced in unison to the point where the angle of rotation 1e is 0° (point A in FIG. 9D), after which point the upper surface 9a and the lower surface 9b of the guide track 90 become upwardly vertically displaced in unison until the point where the angle of rotation 1e is −90° (point C in FIG. 9D). An example of the profile of the dip described above is shown in FIG. 9B. When the guide track 90 dips, the control wheels 8m, 8n are vertically downwardly displaced, which causes the blade-pair to open. Thus, during the course of the dip, the blade-pair gradually opens as the control rod 8a descends and then closes as the control rod 8a ascends. At point A (i.e. 1e=0°), the guide track 90 exhibits its maximum dip 9m. At this point, the blade-pair is open to its maximum angle of opening 1f.

Figure 7A:
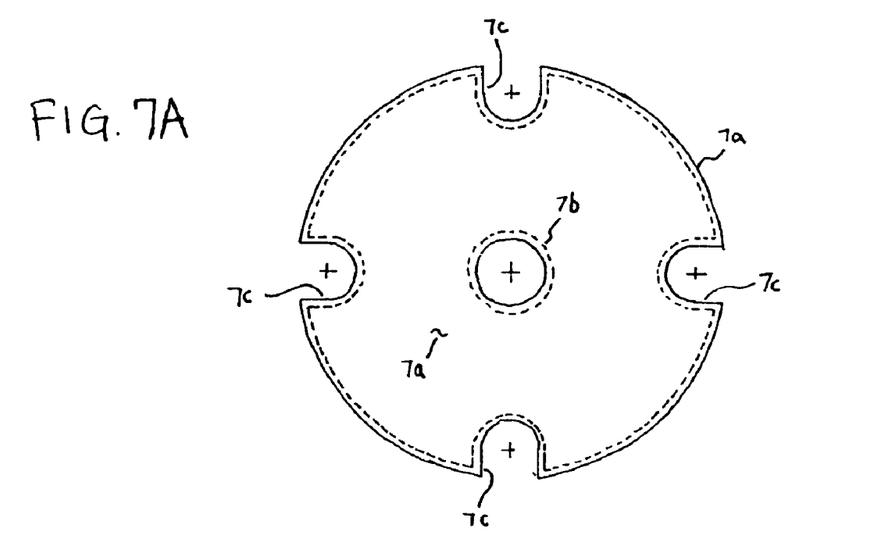
FIG. 7A is a plan view of a cover according to an embodiment of the present invention.
Figure 7B:
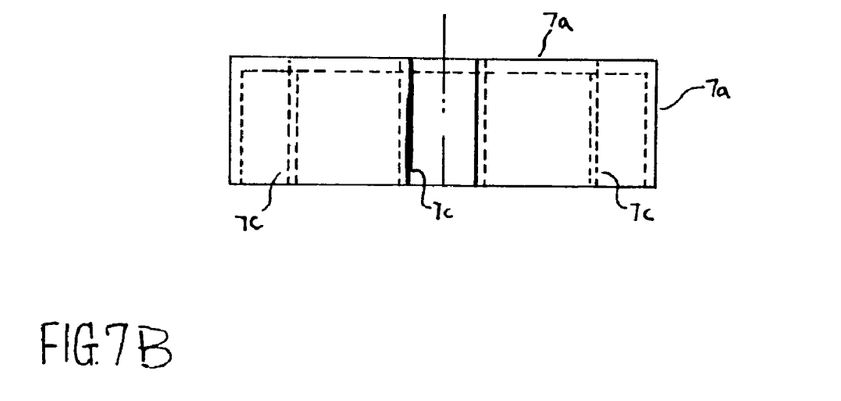
FIG. 7B is a side view of the cover depicted in FIG. 7A.

Optionally, the blade-pair assembly may also include a cover 7a, which is cylindrical in shape and adapted to be placed on the upper rotating disc 6d of the rotating disc 70. The cover 7a may include a plurality of notches 7c (in this embodiment, four), which may be disposed at 90° intervals which coincide with the upper support tubes 6a used to support the control rods 8a. A hub 7b is formed in the center of the cover 7a and is fastened to the power shaft 4c. Thus, rotational power may be directly transferred to the cover 7a, which will further assist in the rotation of the blades.

According to the present invention, each rotating propeller blade is made to change its area S, perpendicular to the incoming tangential rotational velocity vector 1v, in each revolution. This is accomplished by opening and closing each blade-pair 20, 21, 22, 23 at specified intervals of each rotation. Each blade area S will reach its designed maximum area at a given location in the rotation cycle. This maximum blade area location (at 1e=0°) is common to all blade-pairs 20, 21, 22, 23 in a multiple-blade propeller 10. After each blade-pair reaches its maximum surface area S, it will quickly reduce its blade area S to a minimum for the remaining revolution cycle. Each blade-pair pushes the air away, which increase the air mass tangential and radial velocity components asymmetrically in each revolution. This action increases the air mass momentum, which exerts opposite drag force components on the blades 1a, 1b. Since the blade-pairs' rotating shaft 4c may be attached to the aircraft structure frame (as described below), these asymmetrical drag forces on the blade-pairs push on the aircraft.

Propellers according to the present invention may be used individually or in combination. According to some embodiments of the present invention, the propellers may be used in counter-rotating pairs sharing an axis of rotation, or as counter-rotating pairs with parallel axes of rotation.

Propellers according to embodiments of the present invention may be used on an airplane to provide asymmetric drag which may simultaneously propel an airplane in forward flight, improve airplane wing lifting capabilities and prevent or delay wing stall during very low speed high angle-of attack landing/take-off maneuvers.

Propellers according to embodiments of the present invention may, more generally, be used to propel any vehicle or vessel, such as an airplane, boat, submarine or the like, through any fluid, such as air or water.

Figure 11A:
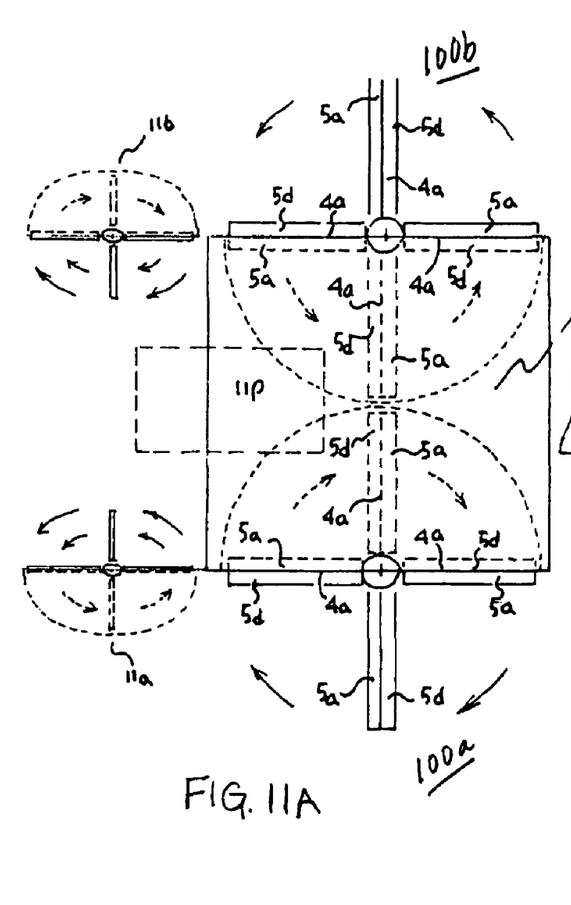
FIG. 11A is a plan view showing the arrangement of four propellers on an airplane, according to an embodiment of the present invention.

According to one embodiment of the present invention, propellers 10 are used on an airplane 200 as shown in FIGS. 11A through 11C, and FIGS. 12A through 12C. FIG. 11A shows a top view of an airplane 200 employing two counter-rotating parallel-axes asymmetrically changing-shape propellers 100a, 100b and two tilted-constant-pitch regular propellers 11a, 11b. A single power source 11p drives all four propellers through power transmission mechanisms 11m, 11n (shown generally). The details of the power transmission mechanisms 11m, 11n are well-known in the art and are not described in detail. A first tilted-fixed-pitch regular propeller 11a is disposed on the right side of the top wing surface 11c of the airplane 200, and a second tilted-fixed-pitch regular propeller 11b is disposed on the left side of the top wing surface 11c of the airplane. The first tilted-fixed-pitch regular propeller 11a and the second tilted-fixed-pitch regular propeller 11b rotate in opposite directions about non-parallel tilted axes. The two asymmetrically changing-shape propellers 100a, 100b according to the present invention, also rotate in opposite directions about axes parallel to each other. A first asymmetrically changing-shape propeller 100a is disposed on the right side of the top wing surface 11c of the airplane 200, and a second asymmetrically changing-shape propeller 100b is disposed on the left side of the top wing surface 11c of the airplane 200.

Figure 11B:
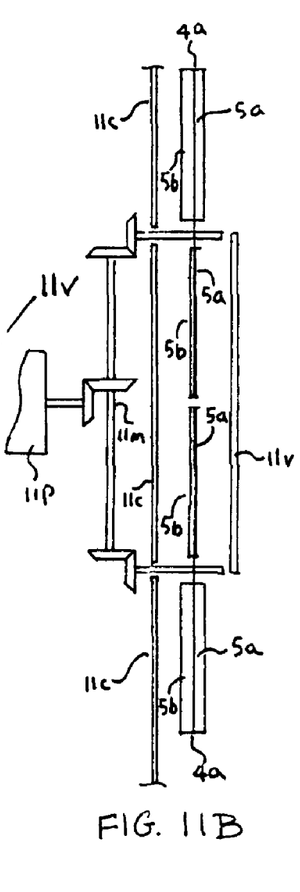
FIG. 11B is a side view of the airplane propeller arrangement depicted in FIG. 11A.

A protection shield 11v is provided on the top wing surface 11c of the airplane to shield a portion of each rotating propeller 100a, 100b as shown in FIG. 11B. The protection shield 11v may be made of canvas or any other suitable material. The purpose of the protective shield 11v is to reduce drag during forward flight.

Figure 11C:
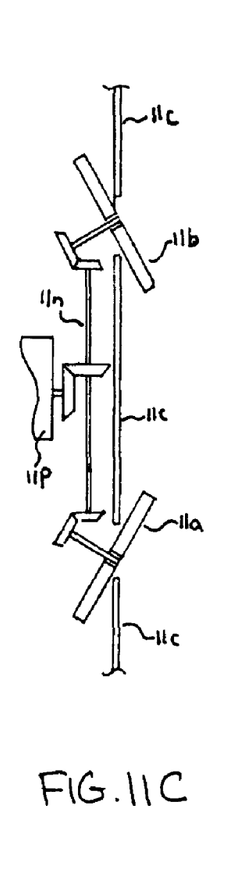
FIG. 11C is another side view of the airplane propeller arrangement depicted in FIG. 11A.

As shown in FIG. 11B, the rotating propellers 100a, 100b are disposed above the top wing surface 11c of the plane but below the level of the canvas shield 11v. The two tilted-constant-pitch regular propellers 11a, 11b are mounted so that throughout a half cycle of rotation for each of the propellers 11a, 11b, the blades are below the top wing surface 11c of the airplane, as shown in FIG. 11C.

Figure 12A:
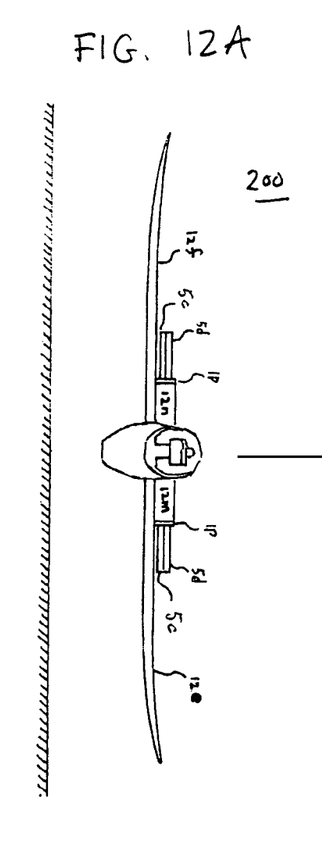
FIG. 12A is a front view of an airplane according to an embodiment of the present invention.
Figure 12B:
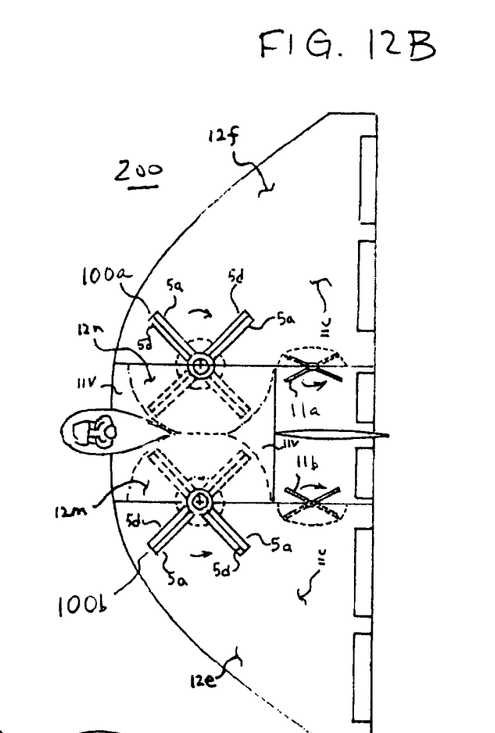
FIG. 12B is a top view of the airplane depicted in FIG. 12A.
Figure 12C:
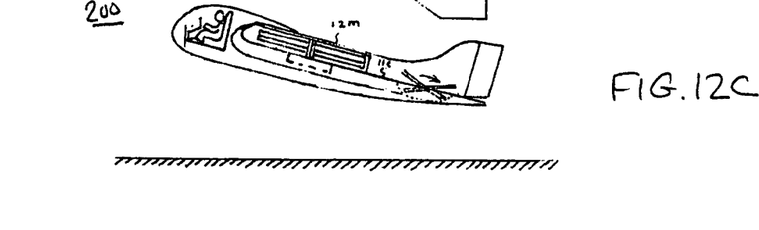
FIG. 12C is a side view of the airplane depicted in FIG. 12A.

FIGS. 12A through 12C show the propellers 100a, 100b, 11a, 11b as mounted on the airplane 200. In this case, the protective shield 11v is split into a right shield 12n and a left shield 12m. As shown, the left propellers 10b, 11b are mounted on the left wing 12e, and the right propellers 100a, 1a are mounted on the right wing 12f.

According to this embodiment, the rotational planes of the two parallel-axis counter-rotating propellers 100a, 100b are slightly above the upper surface 11c of each wing 12e, 12f. These counter-rotating propellers 100a, 100b generate thrust forces which push the airplane 200 in forward flight. At the same time they increase the air velocity, thereby decreasing the air pressure above the wing. This action improves the wing lift capability. During high angle-of-attack takeoffs and landings, these counter-rotating propellers 100a, 100b force airflow over the wing top surface 11c, which prevents or delays wing stall. In addition, the thrust vectors generated by these propellers 100a, 100b are also tilted upward to assist aircraft lift. The net effect will allow this aircraft to take-off and land at shorter or possibly no runways, thereby enabling spot take-off and landing.

Propellers according to embodiments of the present invention, for example a pair of propellers, may be arranged in a horizontal, co-axial counter-rotating configuration within a wind turbine to exploit wind energy in accordance with known wind turbine systems. According to this embodiment, the blade-pairs absorb wind kinetic energy, as more fully illustrated in FIG. 13.

Figure 13:
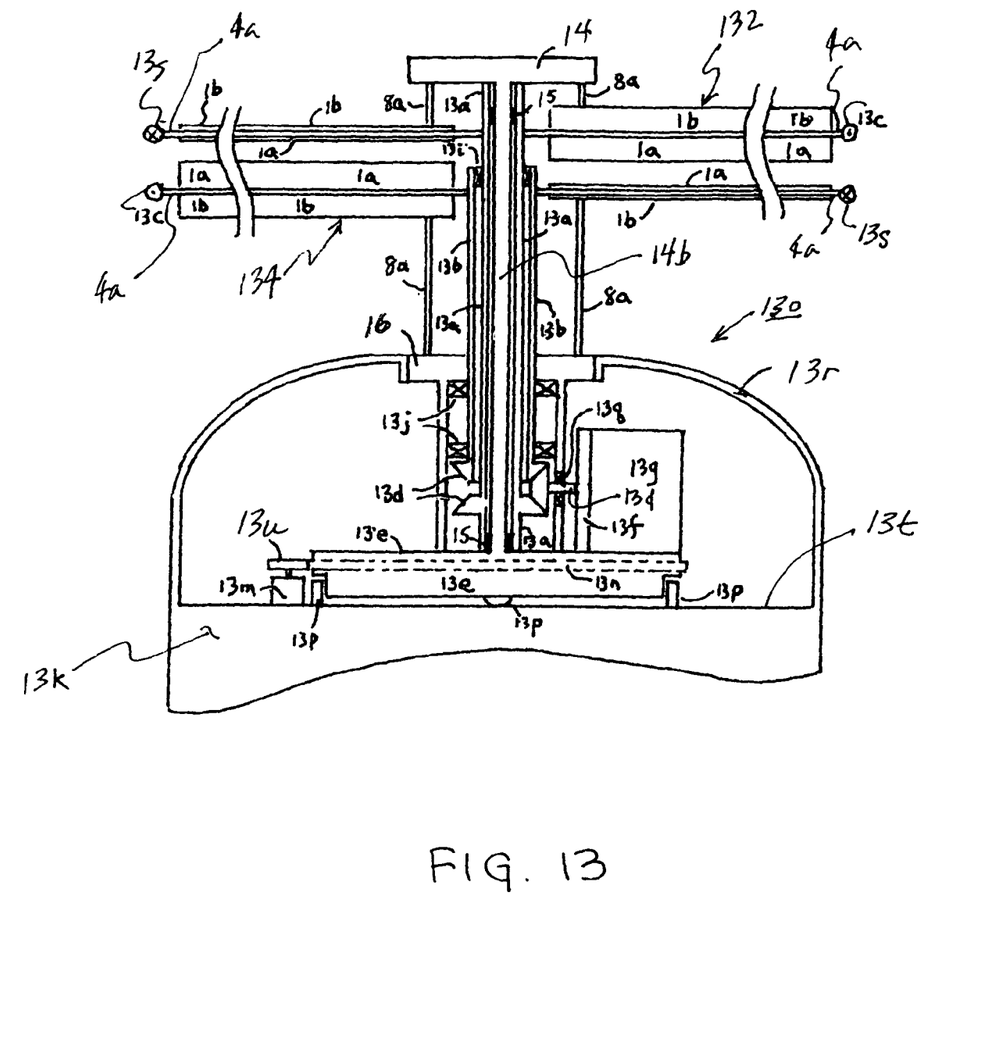
FIG. 13 is a cross-sectional view of a windmill according to an embodiment of the present invention.

FIG. 13 illustrates an embodiment of the propeller blades according to the present invention as applied to a windmill. FIG. 13 is a cross-sectional view of a portion of a windmill, which includes co-axial, counter rotating propellers which rotate about co-axial propeller shafts 13a, 13b. Each propeller may contain four equally spaced blade-pairs, as shown in FIG. 1. Each blade-pair consists of an upper blade 1a and a lower blade 1b, as described above. This windmill can be located on top of a water tower 13k, as shown in FIG. 13, or on top of a building or any other structure.

According to one embodiment of the present invention, the coaxial propeller assembly of the windmill 130 includes a circular base structure 13e located within the outer housing 13r of the water tower 13k. The circular base structure 13e includes wheels 13p disposed along a perimeter thereof, so as to be downwardly protruding. According to a preferred embodiment, the base structure 13e includes four, equally-spaced wheels 13p. The wheels 13p move in a circular track (not shown) formed in a platform 13t of the water tower 13k, which supports the coaxial blade-pair structure. An electric motor 13m is mounted on the platform 13t, and has a gear 13u attached thereto, which engages a gear 13n attached to the base structure 13e. According to this arrangement, when the motor 13m operates, the gear 13u rotates and engages the gear 13n, so as to rotate the base structure 13e. The base structure 13e, however, does not continuously rotate, but only rotates when necessary as described below.

An inner propeller shaft 13a is rotatably mounted on the base structure 13e, perpendicular to the plane of the base structure 13e, as described below, so as to rotate with respect thereto. Similar to FIG. 4, in this embodiment, rigid connecting members 4a are attached to an upper end of the inner propeller shaft 13a. Preferably, four rigid connecting members 4a may be arranged in a T-shape around the inner propeller shaft 13a. Each rigid connecting member 4a contains a blade pair consisting of an upper blade 1a and a lower blade 1b, as described in more detail above. In the windmill embodiment, however, the first blade 1a includes a leading portion 5a, as shown in FIG. 10, but the trailing portion of 5c may be much reduced and exists only to provide a connection to the depending fin 5e for connection to the actuating mechanism. Also, second blade 1b includes a leading portion 5b, as shown in FIG. 10, but does not include any portion of the trailing portion 5d. Thus, the blade pair includes a first blade 1a and a second blade 1b which pivot about the connecting member 4a, but which essentially do not include trailing portions 5c, 5d. This is because during the first half of each rotation cycle, the blade pair will be closed ($1f=0$) to keep air resistance to a minimum, as the blade pair rotates into the wind. Here, the blade pair hinge axis 4a is leading the closed blade pair 1a and 1b in rotation into the wind. This applies to clockwise or counter-clockwise rotation.

During the second half cycle of rotation, hinge axis 4a will lead the blade pair 1a, 1b in the general direction with the wind. The angle if between the blade pair 1a, 1b starts to open at the beginning of this half cycle and reach its maximum value halfway through this half cycle. Finally, the blade pair 1a, 1b will be completely closed ($1f=0$) at the end of this half cycle.

As the blade pair 1a, 1b move in the general direction with the wind (with $1f>0$), the wind will push into the opened blade pair cavity, thus forcing the blade pair 1a, 1b to rotate. Removing 5d and most of 5c will produce less air resistance and improve the wind energy absorption during this half cycle.

The inner propeller shaft 13a is surrounded by the coaxial outer propeller shaft 13b. Bearings 13i support the inner propeller shaft 13a within the outer propeller shaft 13b.

The cam track and control mechanism, as described in conjunction with FIGS. 9 and 10, similarly controls the opening and closing of the blade pairs in the windmill embodiment. As shown in FIG. 13, the propeller assembly includes a first control mechanism 14 for controlling the upper propeller, and a second control mechanism 16 for controlling the lower propeller. The first and second control mechanisms 14, 16 have guide tracks 90 formed on inner surfaces thereof (not shown) for guiding wheels 8m, 8n (not shown) which cause the control rods 8a to move up and down, so as to open and close the blade pairs; according to the mechanical mechanism heretofore illustrated in FIG. 10, for example.

The first control mechanism 14 includes a shaft 14b which is fixedly mounted to the base structure 13e. The inner propeller shaft 13a surrounds the shaft 14b, and bearings 15 support the inner propeller shaft 13a around the shaft 14b. According to this arrangement, the inner propeller shaft 13a rotates with respect to the base structure 13e, and the first control mechanism 14 only rotates in conjunction with rotational adjustments of the base structure 13e as described below.

The second control mechanism 16 is also fixedly mounted to the base structure 13e for rotation therewith so as to control the opening and closing of the lower propeller blade-pairs. Similar to the operation of the first control mechanism 14, the second control mechanism 16 generally remains stationary and only rotates in conjunction with rotational adjustments of the base structure 13e due to change in wind direction as described below. Bearings 13j support the outer propeller shaft 13b in the second control mechanism 16. Power is transferred from the blade pairs 1a, 1b through the shafts 13a, 13b, to the bevel gears 13d, to the horizontal bevel gear support shaft 13q, and to the gear box 13f, which transfers the power to the electric generator 13g, to generate electricity.

As discussed above, the base structure 13e remains stationary while the propeller shafts 13a, 13b rotate. The base structure 13e is only rotated in response to a change in wind direction.

The end of each rigid connecting member 4a contains a pitot tube (or any other type of air pressure sensor) having an intake end 13c which is open and faces the incoming air velocity vector which is the rector sum of wind vector and the blade rotational velocity vector. A rear end 13s of the pitot tube is closed and opposite the intake end 13c. The pitot tube is used to measure dynamic pressure on the rotating blade pair, according to formulas and methods well-known to one of ordinary skill in the art. As the wind changes direction, the dynamic pressure as measured by the pitot tubes changes. When this change in the direction of all air velocity vectors 1v are stabilized, the electric motor 13m rotates the base structure 13e, which controls the opening and closing location of the blade pairs, so as to open the blade pair 132, 134 to a maximum opening angle 1f at the point where the blade pairs are directly perpendicular to the incoming stabilized wind air velocity vector, as described above.

The propellers of the present invention push the air using the drag force developed on the blade-pair propeller. It is often easier to produce large drag force on a moving object than to produce large lift force on the same object. Generally, the maximum drag coefficient can be as high as 2.0 while the corresponding maximum lift coefficient is about 0.6 before wing stall and reduced lift on the moving surface. Another advantage of the propellers of the present invention is that they can be made to rotate closely above and/or below a wing surface. This will improve the wing lift capability especially at high angle of attack maneuvers, and, with the flaps down during takeoffs and landings, there will be less of a chance of wing stall. In addition, the propellers of the present invention have a small clean profile when placed on top of a building to absorb wind energy.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A propeller comprising:
a plurality of propeller blades rotating through a fluid and having adjustable drag coefficients;
a plurality of actuators connected to the plurality of propeller blades for adjusting the drag coefficients of the propeller blades; and
a controller connected to the plurality of actuators for controlling the plurality of actuators such that the drag coefficients of each propeller blade is adjusted according to a pattern that is dependent upon the rotational angle of the particular propeller blade and such that a lift force is not developed by the plurality of propeller blades at any rotational angle,
wherein the propeller is mounted on an airplane.

2. The propeller of claim 1, wherein each revolution of the propeller blades includes a predetermined angle of rotation at which the controller controls the plurality of actuators such that the drag coefficient of each propeller blade is maximized, and wherein each revolution of the propeller blades further includes a maximizing range of angles of rotation, which comprises a range of instantaneous angles of rotation from +80° to −80° with respect to the predetermined angle of rotation, and the drag coefficient of each propeller blade is at a minimum outside the maximizing range of angles of rotation.

3. The propeller of claim 1, wherein the plurality of propeller blades are each comprised of a blade pair comprising an upper blade, a lower blade and a hinge connecting the upper blade to the lower blade,
and wherein the plurality of actuators rotate the upper blade and lower blade about an axis of the hinge towards each other to a closed position, and also rotate the upper blade and lower blade about an axis of the hinge away from each other to an open position,
wherein the plurality of actuators maximizes the drag coefficient of each propeller blade by opening the blade pair and minimizes the drag coefficient of each propeller blade by at least partially closing the blade pair.

4. The propeller of claim 3, further comprising
a motor having a rotatable motor shaft defining a central axis of rotation, and
at least one arm for connecting each blade pair to the motor shaft, wherein each blade pair rotates about the central axis of the propeller through at least one complete revolution, and wherein the plurality of actuators open each blade pair at least one predetermined point in the revolution, so that each blade pair opens at the same at least one predetermined point; and wherein the plurality of actuators close each blade pair after the at least one predetermined point is passed and do not open the blade pair again until it approaches the at least one predetermined point on the next revolution.

5. The propeller of claim 4, wherein the predetermined point is at a rotational angle of 0 degrees as measured from a start position in the plane of rotation.

6. The propeller of claim 1, wherein the plurality of propeller blades comprise two or more propeller blades.

7. The propeller of claim 3, wherein, during rotation, the blade pair opens and closes in a direction directly facing the oncoming fluid so as to exert a force which pushes the fluid.

8. A propeller comprising:
a plurality of propeller blades rotating through a fluid and having adjustable drag coefficients;
a plurality of actuators connected to the plurality of propeller blades for adjusting the drag coefficients of the propeller blades; and
a controller connected to the plurality of actuators for controlling the plurality of actuators such that the drag coefficients of each propeller blade is adjusted according to a pattern that is dependent upon the rotational angle of the particular propeller blade and such that a lift force is not developed by the plurality of propeller blades at any rotational angle, wherein the plurality of propeller blades are each comprised of a blade pair comprising an upper blade, a lower blade and a hinge connecting the upper blade to the lower blade, the plurality of actuators rotate the upper blade and lower blade about an axis of the hinge towards each other to a closed position, and also rotate the upper blade and lower blade about an axis of the hinge away from each other to an open position, the plurality of actuators maximizes the drag coefficient of each propeller blade by opening the blade pair and minimizes the drag coefficient of each propeller blade by at least partially closing the blade pair, the controller comprises a base having a guide track formed in a surface thereof, the plurality of actuators each comprise a control link assembly and at least one guide bearing connected to the control link assembly, wherein the control link assembly is attached to the blade pair, and the at least one guide bearing is attached to the control link assembly and travels in the guide track, and the control link assembly extends and contracts as the at least one guide bearing travels along the guide track to close and open the blade pair thereby altering the drag coefficient of the blade pair.

9. The propeller of claim 8, wherein the guide track includes a flat portion oriented perpendicular to an axis of rotation of the propeller and at least one dip at a predetermined location where the guide track deviates from the flat portion such that the at least one guide bearing moves when it encounters the at least one dip so as to extend the control link assembly, causing the blade pair to open and thereby increasing the drag coefficient of the blade pair.

10. The propeller of claim 3, wherein the plurality of propeller blades comprises at least two propeller blades which are spaced 180 degrees apart, so that when a first propeller blade is in an open position the opposite second propeller blade is in a closed position.

11. An airplane comprising one or more of the propellers of claim 1.

12. An airplane comprising two counter-rotating propellers of claim 1, wherein the propellers are arranged on parallel axes.

13. An airplane comprising two counter-rotating propellers of claim 1, wherein the propellers are arranged on titled axes.

14. An airplane comprising one or more pairs of counter-rotating propellers of claim 1, wherein the rotation of the propellers occurs above and/or under a wing surface of the airplane and/or at least partially inside a fuselage of the airplane.

15. A method for propelling a vehicle or vessel through a fluid, comprising the steps of:

rotating a propeller of one or more blades; and adjusting the drag of each of the one or more blades according to a pattern that is dependent upon the rotational angle of the particular propeller blade, wherein a lift force is not developed by any propeller blade at any rotational angle, wherein the vehicle or vessel is one of an airplane, a boat, an airboat, a flying boat and a submarine and the fluid the vehicle or vessel is propelled through is at least one of water and air.

16. The method of claim 15, wherein each revolution of the one or more blades includes a predetermined angle of rotation at which the drag of each of the one or more blades is adjusted such that the drag of each blade is maximized, and wherein each revolution of the one or more blades includes a maximizing range of angles of rotation, which comprises a range of angles of rotation from +80° to −80° with respect to the predetermined angle of rotation, and the drag coefficient of each of the one or more blades is at a minimum outside the maximizing range of angles of rotation.

17. The method of claim 15, wherein the drag coefficient of each propeller blade is maximized by spreading open a hinged upper blade and lower blade of the propeller blade and the drag coefficient of each propeller blade is minimized by closing or at least partially closing the hinged upper blade and lower blade of the propeller blade.

18. The propeller of claim 1, wherein the controller controls the plurality of actuators such that drag coefficient of each propeller blade is at a minimum for at least 200 degrees per 360 degree revolution of the propeller.

19. The propeller of claim 8, wherein:

the guide track comprises a top guide surface and a bottom guide surface, the top guide surface and bottom guide surface are parallel to each other and oriented perpendicular to the axis rotation of the propeller in the flat portion of the guide track, and the plurality of actuators each comprise at least a top guide bearing and a bottom guide bearing, wherein the top guide bearing is in contact with the top guide surface and the bottom guide bearing is in contact with the bottom guide surface when each actuator is in the flat portion of the guide track.

20. The propeller of claim 19, wherein a distance between the top guide surface and bottom guide surface is fixed in the flat portion of the guide track but varies in a portion of the guide track including the at least one dip, such that at least one of the top guide bearing and bottom guide bearing is not in contact with the top guide surface or bottom guide surface, respectively, in the portion of the guide track including the at least one dip.

21. The propeller of claim 8, wherein the control link assembly includes at least a control rod attached to the at least one guide bearing, a first control link pivotally attached at a first end to a distal end of the control rod and pivotally attached at a second end to an upper blade of a blade pair, a second control link pivotally attached at a first end to the distal end of the control rod and pivotally attached at a second end to a lower blade of the blade pair, the control link assembly being configured to move the blade pair to the closed position when the at least one guide bearing moves the control rod towards the blade pair.

22. The propeller of claim 21, wherein the blade pair is in the closed position when the at least one guide bearing is in the flat portion of the guide track.

* * * * *